Patented Apr. 24, 1951

2,549,935

UNITED STATES PATENT OFFICE 2,549,935

POLYMERS OF HEXAFLUOROPROPENE

John C. Sauer, Wilmington, Del., assignor to E. I. du Pont de Nemours & Company, Wilmington, Del., a corporation of Delaware No Drawing. Application June 18, 1946, Serial No. 677,529

8 Claims. (Cl. 260—87.5)

This invention relates to new polymeric materials and more particularly to copolymers comprising hexafluoropropene.

An object of this invention is to provide new and improved polymerization products and a method of preparing them. A further object is the preparation of valuable high molecular weight copolymers comprising hexafluoropropene. Other objects will be apparent from a description of the invention given hereinafter.

The above objects are accomplished according to the present invention by subjecting to polymerization conditions a mixture comprising hexafluoropropene and another ethylenically unsaturated polymerizable compound. For example, a polymerization mixture comprising hexafluoropropene and a polymerizable compound having the group

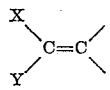

where X and Y are hydrogen or fluorine, can be used. More specifically hexafluoropropene can be copolymerized with polymerizable unsaturated compounds selected from the group consisting of vinyl compounds, vinylidene compounds, and compounds having the formula

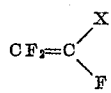

where X is halogen.

Still more specifically these objects can be realized by subjecting to polymerization conditions a mixture comprising hexafluoropropene and tetrafluoroethylene, ethylene or vinyl chloride and the like.

The following examples, wherein parts and per cents are by weight, unless otherwise specified, illustrate specific embodiments of this invention:

Example 1

A stainless steel, high pressure reactor is flushed with oxygen-free nitrogen and then is charged with 200 parts of deoxygenated water, 0.15 part of ammonium persulfate and 1.0 part of sodium pyrophosphate. The water occupies about one-half of the total internal volume of the reactor. The reactor is closed, evacuated, cooled in a solid carbon dioxide-methanol mixture, and is then further charged with 20 parts of hexafluoropropene and 60 parts of tetrafluoroethylene. The reactor is agitated and heated to 55° C.–64° C. for 9.8 hours; a pressure of 250–650 atmospheres is maintained by water injection.

The reactor is then cooled to room temperature and the unreacted gases collected by water displacement. The molecular weight of the gaseous mixture is measured and from these data it is calculated that the gaseous mixture contains 58.5% of hexafluoropropene.

The copolymer is discharged from the reactor, washed with distilled water, suspended for 3 hours in a refluxing solution containing 200 cc. of concentrated hydrochloric acid and 50 cc. of acetic acid, filtered, and again washed with water, and air-dried at a pressure of about 200 mm. at 60° C. for 48 hours. The amount of copolymer thus obtained is 37.2 parts. Based on the weight of the copolymer and the composition of the unreacted monomer mixture, a materials balance calculation indicates that the copolymer contains 80% of tetrafluoroethylene and 20% of hexafluoropropene.

The copolymer is pressed into clear, tough films at 350° C. in a laboratory Carver press. These films have a tensile strength of 2000 p. s. i. at 300% elongation, and soften at about 310° C. The films are totally resistant to the action of concentrated sulfuric acid at 100° C. or to a sodium hydroxide-potassium hydroxide eutectic at 280° C. The films have a dielectric constant of 2.17 and a power factor of 0.00014 at 1000 cycles. Filaments are formed by extruding the polymer through a die at 370° C. under a load of 200 p. s. i.

Example 2

A high pressure reactor is charged as described in Example 1 except that 15 parts of hexafluoropropene and 85 parts of tetrafluoroethylene are used. The reactor is agitated and heated at a temperature of 60° C.–61° C. for 9.2 hours. The pressure is maintained at 460–500 atmospheres by water injection. The reactor is then cooled to room temperature. Based on a materials balance determination, the copolymer contains 86.6% of tetrafluoroethylene and 13.4% of hexafluoropropene. The amount of copolymer obtained is 18 parts.

Clear tough films, which can be pressed at 340° C.–350° C. in a laboratory Carver press, have a tensile strength of 1750 p. s. i. at 230% elongation and soften in the range of 325° C.–330° C. These films are likewise completely resistant to the action of sulfuric acid at 100° C. or to a sodium hydroxide-potassium hydroxide eutectic at 280° C. The power factor of the pressed films is 0.00015 at 1000 cycles and the dielectric constant is 2.18. The copolymer can be extruded into filaments by forcing it through a die at 400° C. under a load of 200 p. s. i.

*Example 3*

A high pressure reactor is charged as described in Example 1 with 50 parts of deoxygenated water, 0.2 part of ammonium persulfate, 7.5 parts of hexafluoropropene and 20 parts of tetrafluoroethylene. The reactor is agitated and heated at a temperature of 57° C.–80° C. for 14.5 hours. A pressure of 50–100 atmospheres is maintained in the reactor by water injection. After cooling the reactor to room temperature, the copolymer is discharged, washed with distilled water and air-dried at 150° C. for 2 hours. The amount of copolymer thus obtained is 24 parts.

The copolymer is pressed into clear, tough films at 350° C. in a laboratory Carver press. These films have a tensile strength of 1750 p. s. i. at 84% elongation and a zero tenacity temperature of 320° C.

*Example 4*

A stainless steel high pressure reactor is flushed with oxygen-free nitrogen and is then charged with 200 parts of oxygen-free water and 0.2 part of lauroyl peroxide. The water occupies about one-half of the total internal volume of the reactor. The reactor is closed, evacuated, cooled in a solid carbon dioxide-methanol mixture, and is then further charged with 15 parts of hexafluoropropene and 70 parts of ethylene. The reactor is agitated and heated to 70° C. and the pressure in the reactor is maintained at 575–600 atmospheres by the injection of oxygen-free water. After 9.5 hours, the reactor is cooled to room temperature, the unreacted portion of the gaseous monomers is bled off, and the contents of the reactor are discharged. After filtering, the lumpy copolymer is washed with distilled water and the copolymer subsequently dried in an oven at 100° C. for 24 hours. The amount of copolymer thus obtained is 7 parts. This copolymer contains 28.5% fluorine which corresponds to 37.5% of hexafluoropropene and 62.5% of ethylene. The copolymer is soluble in refluxing xylene, from which a clear film is prepared by casting the solution on a glass plate and allowing the solvent to evaporate.

*Example 5*

A stainless steel high pressure reactor is charged, as described in Example 4, with the following:

200 parts of deoxygenated water
0.15 part of ammonium persulfate
1.0 part of sodium pyrophosphate
25 parts of hexafluoropropene
75 parts of vinyl chloride The reactor is agitated, heated to 60° C. and the pressure in the reactor is maintained at 850–950 atmospheres by the injection of oxygen-free water. After 9.5 hours the reactor is cooled to room temperature, the unreacted portion of the monomers is bled off and the contents of the reactor are discharged. After drying, 29 parts of a hexafluoropropene/vinyl chloride copolymer are obtained. This copolymer contains 1.2% of fluorine which corresponds to 1.6% of hexafluoropropene and 98.4% of vinyl chloride. Films prepared by hot pressing the copolymer at 115° C. between steel plates covered with aluminum foil are capable of being permanently elongated and have tensile strengths of 6850 p. s. i. at 12% elongation.

It will be understood that the above examples are merely illustrative and that the invention broadly comprises the process (and products obtained thereby) of preparing new copolymerization products comprising subjecting to polymerization conditions a mixture including hexafluoropropene and another ethylenically unsaturated polymerizable compound.

The hexafluoropropene is generally present in the polymerization mixture in an amount varying from 5 to 95%; the prefered monomer charge contains 5–35% hexafluoropropene. In order that the properties of the hexafluoropropene copolymer differ appreciably from the the product obtained by the polymerization of the comonomer alone, it is essential that the copolymer contain at least 1% and preferably at least 5% of hexafluoropropene. The most attractive copolymers are those containing from 5 to 50% of hexafluoropropene.

The polymerizable unsaturated organic compounds useful in forming the present copolymers with hexafluoropropene are characterized by their ability to undergo polymerization with hexafluoropropene to form macromolecular polymers. Examples of such compounds are mono-ethylenic hydrocarbons e. g. ethylene, propylene, isobutylene and styrene; halogenated compounds e. g. 1,1-difluoro-2-chloroethylene, trifluoroethylene, chlorotrifluoroethylene and particularly the vinyl halides e. g. vinyl fluoride, vinyl chloride and vinyl bromide; vinyl carboxylates e. g. vinyl formate, vinyl acetate, vinyl propionate, vinyl benzoate; alpha-methylene monocarboxylic acids and their esters, nitriles, amides, anhydrides, and acid halides e. g. methyl methacrylate, methacrylic acid, methyl alpha-chloroacrylate, acrylonitrile, methacrylic amides, methacrylic acid anhydride and methacrylic acid chloride; vinyl ethers e. g. vinyl methyl ether and vinyl butyl ether; vinyl ketones e. g. vinyl methyl ketone and vinyl phenyl ketone; N-vinyl compounds e. g. N-vinylsuccinimide, N-vinylphthalimide and N-vinylcarbazole; compounds having more than one ethylenic double bond e. g. butadiene, isoprene, 2-fluoro-1,3-butadiene, 2-chloro-1,3-butadiene, 2-cyano-1,3-butadiene; vinylidene compounds e. g. vinylidene chloride; and compounds containing acetylenic unsaturation in addition to the ethylenic double bond e. g. monovinylacetylene, divinylacetylene and vinyl-(ethinyl)carbinols. Of the class of polymerizable unsaturated compounds disclosed above, those having the

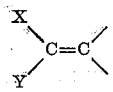

group wherein X and Y are hydrogen or fluorine, are preferred because they copolymerize most readily with hexafluoropropene. Particularly desirable hexafluoropropene copolymers are obtained when the comonomer is tetrafluoroethylene, vinyl chloride, or ethylene. Hexafluoropropene can be effectively copolymerized with one or more of the above polymerizable compounds to obtain two, three or multicomponent copolymers.

As will be appreciated, it is usually desirable to carry out the reactions of this invention in the presence of a polymerization initiator. Compounds most suitable for this are those containing the peroxy linkage O—O and certain aliphatic azo compounds. Examples of these compounds are acyl peroxides e. g. dibenzoyl peroxide, benzoylacetyl peroxide, dilauroyl peroxide, diacetyl peroxide; dialkyl peroxides e. g. diethyl peroxide, ditertiarybutyl peroxide or dipropyl peroxide; hydrogen peroxide; salts of true non-metallic peracids e. g. ammonium persulfate, potassium persulfate, and sodium persulfate and oxygen; and certain aliphatic azo compounds, preferably those having an alpha-tertiary carbon atom, e. g. alpha, alpha'-azodiisobutyronitrile and the like. The preferred amount of initiator used is in excess of 0.001% but not more than about 5% based on the total weight of monomers. A quantity of initiator above 0.001% through 1% is specifically preferred.

The conditions described herein, for example pressure, under which this invention is carried out, in general, will depend somewhat on the comonomer employed. In some cases pressures as low as 3 atmospheres can be employed, while in other cases pressures as high as 5000 atmospheres are more desirable to achieve the high molecular weight copolymers. Thus with normally liquid comonomers, e. g. vinyl carboxylates or esters of alpha-beta-unsaturated monocarboxylic acids, desirable comonomer concentrations are obtained at relatively low pressures and accordingly the polymerization may be carried out at pressures of 3–100 atmospheres. With normally gaseous comonomers, e. g. olefinic hydrocarbons and halogenated ethylenes (e. g. vinyl fluoride or trifluoroethylene), pressures of 100–1000 atmospheres are preferable. Tertrafluoroethylene copolymers have been prepared at pressures as low as 100 atmospheres, although the preferred range is 500–1000 atmospheres. The ethylene copolymers are best prepared in a pressure range of 300–1000 atmospheres.

Although the above preferred pressures fall within the range of 3–1000 atmospheres, and generally this invention will be practiced within this pressure range, those skilled in the art will appreciate that applicable pressures are not so limited. The lower pressure employed will depend somewhat on such factors as the particular characteristics desired in the copolymer. There is no upper pressure limit whatsoever which may be employed above the preferred pressure insofar as substantial differences in results are concerned. Of course, available apparatus and, more usually, convenience and economy will be influencing factors.

The reaction may be carried out in a closed system if desired. However, it is advantageous to inject (either batch-wise or continuously) a mixture of hexafluoropropene and comonomer in desired proportions as the reaction progresses, or to maintain a desired pressure in the reactor by injecting deoxygenated water. The course of reaction may be followed by the drop in pressure in the reactor. Cessation of the reaction is indicated by cessation of the pressure drop.

As with pressure, the temperature at which this invention may be carried out will depend to some extent on the comonomer employed as well as on the initiator used for inducing the copolymerization reaction. In some instances temperatures of about 10° C. are suitable, while in other instances temperatures of about 300° C. are more desirable. With acyl peroxides as initiators the preferred temperatures are 50° C.–175° C.; with persulfate initiators, 30° C.–100° C.; with azo nitriles as initiators, 10° C.–200° C.; and with oxygen as an initiator, 100° C.–200° C. In general, the preferred temperatures fall within the range of 35° C.–160° C.

While the preferred conditions as to temperature and pressure for practicing this invention consist in maintaining a pressure substantially above atmospheric, and usually within the range of 3–1000 atmospheres, and a temperature of 35° C.–160° C., those skilled in the art will appreciate that, as with pressure, temperatures outside this range and even temperatures outside the range of 10° C.–300° C. set out hereinbefore are applicable. However, temperatures outside this broader range are less practical because of relatively low rate of reaction when substantially lower temperatures are employed and because of the tendency of less desirable qualities to appear in the copolymers when excessively high temperatures are used.

While it is preferable to carry out the reaction in an aqueous medium, organic solvents, instead of or in addition to water, may be employed. Examples of organic solvents include hexane, octane, isooctane, methylcyclohexane, benzene, acetone, methanol, tertiary butanol, and tertiary amyl alcohol.

Finely divided solids which serve as fillers can be included in the polymerization mixture and the polymerization can be carried out in their presence. Examples of such fillers include pigments e. g. titanium dioxide; metals e. g. copper, aluminum, and iron powder; and other finely divided materials e. g. mica, glass and asbestos. These, and similar materials, can also be added to the preformed copolymers.

The hexafluoropropene employed in the practice of this invention should be reasonably pure and should be substantially free of acidic substances such as hydrogen chloride or hydrogen fluoride, and should also be reasonably free of oxygen. Although oxygen is an initiator in the small amounts indicated previously, substantially larger proportions (i. e. above approximately 5%) of oxygen tend to have an undesirable effect upon the reaction.

The equipment employed in carrying out this invention should be of sufficient strength to withstand the pressure and temperatures employed. That portion of the equipment which comes in actual contact with polymerizing systems should be fabricated of or lined with a material which will not rapidly catalyze the decomposition of the initiator, or which will not be rapidly corroded or otherwise affected by any of the components in the polymerizing system. Suitable materials include silver, enamel, glass, stainless steel, monel metal, and nickel. It is preferable that the reacting system be equipped with some means of providing agitation.

The products of this invention are adapted to a variety of uses. They can be molded into films, foils, tapes, and massive articles. Fibers and films of the copolymers of this invention can be used as insulating material by wrapping the article to be insulated or by extruding the hot copolymers around the object to be insulated. Solutions of the soluble copolymers can be used for coating wires, fiberglass, ceramics and the like. For some uses the copolymers can be combined with plasticizers, stabilizers, fillers, pigments, natural resins or other synthetic resins. Hexafluoropropene/tetrafluoroethylene copolymers are particularly outstanding in that they can be readily molded above the softening temperature and therefore are adapted to many uses to which the tetrafluoroethylene polymer itself is unsuited.

As many apparently widely different embodiments of this invention may be made without departing from the spirit and scope thereof, it is to be understood that the invention is not limited to the specific embodiments thereof except as defined in the appended claims.

I claim:

1. The polymerization product of a mixture comprising hexafluoropropene and another ethylenically unsaturated polymerizable compound; the hexafluoropropene being present in the said mixture in an amount of approximately 25% by weight of the combined weight of the polymerizable compounds contained in the said mixture.

2. A new copolymerization product resulting from subjecting to a pressure of at least 3 atmospheres and a temperature of 10° C.–300° C. a mixture comprising hexafluoropropene and a polymerizable fluoroethylene compound, in the presence of a polymerization initiator; the hexafluoropropene being present in the said mixture in an amount of approximately 25% by weight of the combined weight of the hexafluoropropene and the said fluoroethylene compound.

3. The polymerization product of a mixture comprising hexafluoropropene and a polymerizable halogen substituted ethylene compound; the hexafluoropropene being present in the said mixture in an amount of approximately 25% weight of the combined weight of the hexafluoropropene and the said halogen substituted ethylene compound.

4. A new copolymerization product resulting from subjecting to a pressure of at least 3 atmospheres and a temperature of 10° C.–300° C. a mixture comprising hexafluoropropene and tetrafluoroethylene, in the presence of a polymerization initiator; the hexafluoropropene being present in the said mixture in an amount of approximately 25% by weight of the combined weight of the hexafluoropropene and the tetrafluoroethylene.

5. A new copolymerization product resulting from subjecting to a pressure of at least 3 atmospheres and a temperature of 10° C.–300° C. a mixture comprising hexafluoropropene and ethylene, in the presence of a polymerization initiator; the hexafluoropropene being present in the said mixture in an amount of approximately 25% by weight of the combined weight of the hexafluoropropene and the ethylene.

6. A new copolymerization product resulting from subjecting to a pressure of at least 3 atmospheres and a temperature of 10° C.–300° C. a mixture comprising hexafluoropropene and vinyl chloride, in the presence of a polymerization initiator; the hexafluoropropene being present in the said mixture in an amount of approximately 25% by weight of the combined weight of the hexafluoropropene and the vinyl chloride.

7. A new polymerization product resulting from subjecting to a pressure of at least 3 atmospheres and a temperature of 10° C.–300° C. a mixture comprising hexafluoropropene and another ethylenically unsaturated polymerizable compound, in the presence of a polymerization initiator; the hexafluoropropene being present in the said mixture in an amount of approximately 25% by weight of the combined weight of the polymerizable compounds contained in the polymerization mixture.

8. A new copolymerization product resulting from subjecting to a pressure of at least 3 atmospheres and a temperature of 10° C.–300° C. a mixture comprising hexafluoropropene and a polymerizable halogen substituted ethylene compound, in the presence of a polymerization initiator; the hexafluoropropene being present in the said mixture in an amount of approximately 25% by weight of the combined weight of the hexafluoropropene and the said halogen substituted ethylene compound.

JOHN C. SAUER.

REFERENCES CITED

The following references are of record in the file of this patent:

UNITED STATES PATENTS

| Number | Name | Date |
|---|---|---|
| 2,468,664 | Hanford et al. | Apr. 26, 1949 |